Figure 1:
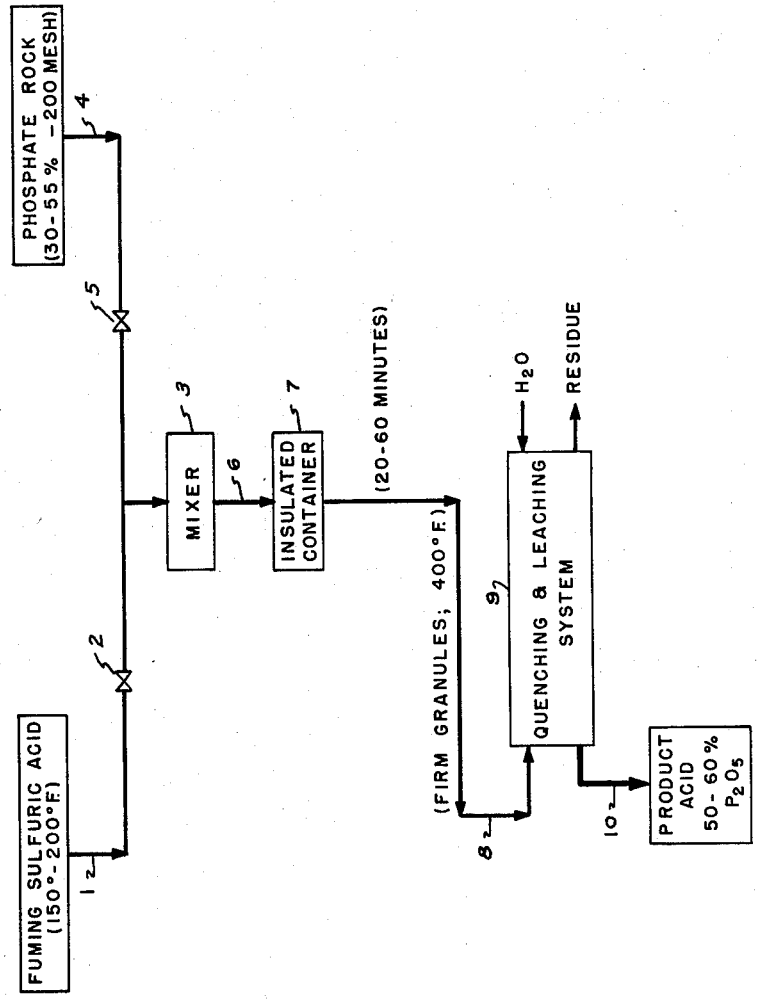

Travis P. Hignett
Archie V. Slack
John M. Potts    INVENTORS.
Larrabee D. Hand, Jr.
BY
Robert A. Petrush
Agent

United States Patent Office 3,161,467
Patented Dec. 15, 1964

3,161,467
DIRECT METHOD FOR THE PRODUCTION OF HIGH-ANALYSIS PHOSPHORIC ACID
Travis P. Hignett and Archie V. Slack, Sheffield, and John M. Potts, Florence, Ala., and Larrabee D. Hand, Jr., Pelham, Ga., assignors to Tennessee Valley Authority, a corporation of the United States
Filed Apr. 17, 1962, Ser. No. 188,285
3 Claims. (Cl. 23—165)
(Granted under Title 35, U.S. Code (1952), sec. 266)

The invention herein described may be manufactured and used by or for the Government for governmental purposes without the payment to us of any royalty therefor.

Our invention relates to a method for the manufacture of phosphoric acid by the so-called wet process in which phosphate rock is treated with sulfuric acid, more particularly to a method for the production of wet-process phosphoric acid of high concentration, and more particularly to a process in which conditions are controlled to obtain an acid of high concentration with a minimum of fluorine content, and more particularly to a method for the production of wet-process phosphoric acid of high concentration wherein the necessity of adding external heat to the system of said process is substantially eliminated therefrom.

Heretofore it has been the practice in the chemical industry to produce wet-process phosphoric acid by digesting phosphate rock in a slurry of weak phosphoric acid and sulfuric acid for 3 to 18 hours so that calcium sulfate crystals resulting from the displacement of the phosphate ion in union with calcium by the sulfate ion can nucleate and grow, removing most of the solids by filtering, washing the filter cake with water to remove the $P_2O_5$, and recycling the wash liquor to the digesting system. As a result of this relatively simple method, manufacture of wet-process phosphoric acid is very economical, although such acid normally contains large quantities of impurities. These impurities are principally iron and aluminum compounds, accompanied by other materials in the phosphate rock which may be soluble in the phosphoric acid. The resulting product acid usually contains only about 30 percent $P_2O_5$. Inasmuch as most of the wet-process phosphoric acid produced by such method is subsequently used in the production of fertilizer by processes which require strong acid, it is necessary to concentrate same to about 50 to 54 percent $P_2O_5$ before the acid can be utilized.

The chemical fertilizer industry has recognized the trend toward the desirability of producing, by a direct method, wet-process phosphoric acid from the acidulation of phosphate rock wherein acid of a concentration of approximately 50 to 54 percent $P_2O_5$ is produced directly, thereby eliminating the necessity of supplying heat such as in evaporating means to concentrate the fresh product acid containing only about 20 to 30 percent $P_2O_5$ to an acid containing about 50 to 54 percent $P_2O_5$.

A fairly recent breakthrough in the above-mentioned maximum $P_2O_5$ content of wet-process phosphoric acid obtained directly by the acidulation of phosphate rock with either sulfuric acid or a mixture of sulfuric acid and phosphoric acid is shown in U.S. Letters Patent No. 2,504,544, Casimer C. Legal, Jr., et al., April 18, 1950. Legal, Jr., et al. discloses a method for the direct production of strong phosphoric acid containing up to about 54 percent $P_2O_5$ by means of a direct wet process which substantially eliminates the necessity of resorting to an evaporation step as disclosed in other prior-art processes. In the teaching of Legal, Jr., et al. a supply of sulfuric acid containing about 98 percent $H_2SO_4$ is heated to a temperature ranging between 100° C. and 300° C. and thence to a pugmill for admixture with finely ground and divided phosphate rock. After the mixing operation the mixture is passed into an indirectly fired rotary heater in which it is heated to a temperature ranging from about 200° C. to 300° C. for a period of about 10 to 30 minutes with the result of the formation of a calcined or clinker product. The resulting calcined or clinker product is then transported directly and preferably without substantial cooling into a system of countercurrent leaching tanks wherein it is dropped directly into strong phosphoric acid. Although the teachings of Legal, Jr., et al. have overcome one of the difficulties present in the prior art viz. the direct production of a wet-process phosphoric acid containing up to about 54 percent $P_2O_5$ as opposed to the production of a wet-process phosphoric acid containing only about 30 percent $P_2O_5$, this process obviously dictates that external heat must be added to the system, and apparently this has prevented said process from being economically competitive with the commercial processes produced industrially up to the present time.

Our invention is directed to a method of producing directly from the acidulation of phosphate rock with sulfuric acid a wet-process phosphoric acid containing up to about 60 percent $P_2O_5$ wherein the disadvantageous necessity of supplying external heat to the process, as is shown in the disclosure of Legal, Jr., et al., is eliminated and the above-mentioned disadvantages of other processes disclosed in the prior art are overcome.

We have overcome the difficulties inherent in the processes of the type of the prior art to a substantial extent in the present invention by a process which comprises acidulating phosphate rock with strong sulfuric acid; holding the resulting acidulate in an insulated container for a period of about 20 to 60 minutes; quenching the resulting hot material in wash liquor from the end step of a countercurrent extraction system; and recovering a product acid containing up to about 60 percent $P_2O_5$ which is strong enough to be shipped or used directly without further concentration in the production of a fertilizer material and which has a further advantage in concentration to the usual acid of commerce (54 percent $P_2O_5$). Furthermore, several new and advantageous features over the conventional processes for the production of wet-process phosphoric acid are realized by the present invention.

Among these advantageous features are: a process for the direct production of a wet-process phosphoric acid of high concentration which eliminates the evaporating or concentrating step, which requires a relatively short time for the removal and recovery of the $P_2O_5$ values from the phosphate rock, which provides for easy separation of the $P_2O_5$ values as product acid, and which produces an acid containing a relatively low impurity content.

It is therefore an object of the present invention to provide a process for the economical and direct production of strong phosphoric acid containing about 60 percent $P_2O_5$ by means of a wet process without resorting to evaporation and without resorting to supplying external heat to the system for drying or calcining an intermediate product prior to quenching same in wash liquor from the end step of a countercurrent extraction system.

Another object of the present invention is to provide a process for the economical and direct production of strong phosphoric acid containing about 60 percent $P_2O_5$ by means of a wet process without resorting to evaporation and without resorting to supplying external heat to the system for drying or calcining an intermediate product prior to quenching same in wash liquor from the end step of a countercurrent extraction system, which process is characterized by the fact that about 93 percent of fluorine originally present in the phosphate rock is eliminated.

Still further and more general objects of our invention are to provide a process for the direct production of strong phosphoric acid containing up to about 60 percent $P_2O_5$, which process requires a relatively short time for the removal and recovery of the $P_2O_5$ values from phosphate rock, which process provides for easy separation of said $P_2O_5$ values as product acid, and which produces an acid containing relatively low impurity content.

In carrying out the objects of our invention in one form thereof, we employ a process which comprises mixing the phosphate rock (about 35 percent minus 200 mesh) with strong sulfuric acid (about 15 to 20 percent free $SO_3$); holding the resulting acidulate in an insulated container for about 20 to 60 minutes to permit fluorine and other gases to evolve and to allow the resulting granules or particles to become dry and firm; quenching the resulting hot acidulate in strong phosphoric acid; and subsequently washing same with water in a countercurrent extraction system.

We have found that a granular or semigranular material is produced when phosphate rock of the proper particle size is acidulated with sulfuric acid of the proper concentration. If the rock particle size is about 35 percent minus 200 mesh, the acid should contain about 15 to 20 percent free $SO_3$. The fineness of the rock should vary inversely with the strength of the acid. The rock may range from 20 to 90 percent through 200 mesh and the acid concentration may range up to about 65 percent free $SO_3$. Cold acid may be used but we have found it somewhat advantageous to use acid preheated to about 150° F. to 200° F. Higher temperatures might be advantageous if closed tanks were used to avoid loss of $SO_3$. The temperature of the mixture rises rapidly to about 550° F. to 600° F. If the fresh acidulate is held in an insulated container while its temperature is in the range of about 400° F. to 600° F., the granules become quite firm. By quenching the hot granules in extract liquor (about 46 percent $P_2O_5$) from the end step of a countercurrent extraction system, acid containing about 50 percent $P_2O_5$ is produced, and over 95 percent recovery of the $P_2O_5$ in the rock is obtained by the countercurrent extraction. The product acid has been found to contain less impurities, such as fluorine, than wet-process acid produced industrially up to the present time.

Our invention, together with further objects and advantages thereof, will be better understood from a consideration of the following description taken in connection with the accompanying drawing in which:

FIGURE 1 is a flowsheet illustrating the principles of our novel process which results in the direct production of strong phosphoric acid containing up to 60 percent $P_2O_5$ and having the properties mentioned above.

Referring now more specifically to FIGURE 1, sulfuric acid containing up to 65 percent free $SO_3$ and preferably 15 to 20 percent free $SO_3$ at a temperature preferably in the range of about 150° F. to 200° F. from a source not shown is fed via line 1 and any suitable means for control of flow 2 into mixer 3. Simultaneously phosphate rock ground to about 35 percent minus 200 mesh from a source not shown is fed via line 4 and any suitable means for control of flow 5 into mixer 3. The acidulated material from mixer 3 is fed via line 6 into an insulated container 7, wherein it is held for a period of approximately 20 to 60 minutes at a temperature in the range from about 400° F. to about 600° F. The resulting dry and firm granules are fed via line 8 at a temperature of approximately 400° F. to 450° F. to a quenching and leaching system, illustrated generally by numeral 9, wherein said granules are quenched in wash liquor containing preferably about 46 to 50 percent $P_2O_5$. Product acid from quenching and leaching means 9 is withdrawn via line 10 as product acid containing 50 to 60 percent $P_2O_5$.

We have found it to be necessary to use sulfuric acid of the proper strength and rock of the proper particle size in order to obtain a granular acidulate with satisfactory physical properties. If the particle size of the rock is too fine, a powdery acidulate is formed. Satisfactory granulation is obtained with either low-grade (32 percent $P_2O_5$) Florida pebble ground to about 50 percent minus 200 mesh or high-grade (34.6 percent $P_2O_5$) Florida flotation concentrate ground to about 35 percent minus 200 mesh if the acid contains 15 to 20 percent free $SO_3$. The acidulate is less sticky and granulates better if hot (about 200° F.) acid is used.

Depending upon the particle size of the rock, the acidulate either is too sticky or does not granulate properly if regular acid of commerce (66° Bé, 93 percent) rather than strong sulfuric acid (15 to 20 percent free $SO_3$) is used. Also, higher reaction temperatures are obtained with such strong acid. The type of agitation provided by the mixer is important. It should provide thorough mixing of the acid and phosphate rock. Also, it should granulate the acidulate. Standard batch mixers used in superphosphate plants probably could be adapted for this process.

It is necessary to hold the material in an insulated container to improve its physical condition. The granules are soft, damp, and slightly sticky immediately after the acidulation step. By holding in an insulated container, the heat of reaction is retained and temperature of the material remains in the range of about 400° F. to 600° F. for approximately an hour. The particles are fairly dry and firm after 20 to 30 minutes in the container. It is desirable to shake or roll the container to keep the material loose and to permit gases to escape from the lower part of the bed. An insulated rotary den might provide the necessary "rolling" action and retention time for this step. About 93 percent of the fluorine in the rock is evolved during the mixing and denning steps.

We have also found it to be necessary to quench the hot acidulate in about 46 percent $P_2O_5$ wash liquor in order to produce 50 percent product acid and to prepare the particles for further washing to remove $P_2O_5$. The 46 percent wash liquor is concentrated to approximately 50 percent $P_2O_5$ in this step, and after removal of the product, the bed of particles is in satisfactory condition to permit relatively rapid washing to remove most of the $P_2O_5$. Satisfactory results are obtained when the temperature of the acidulate is about 400° F. or higher and the weight ratio of quench liquor to acidulate is 0.8. If the proportion of 46 percent $P_2O_5$ quench liquor is less than about 0.8 ratio, the volume of liquor is too small to quench the hot acidulate properly.

Removal of $P_2O_5$ from the quenched acidulate is completed by washing countercurrently in several steps. The liquor from the last step is used to quench hot acidulate; water is added to the first step.

In order that those skilled in the art may better understand how the present invention can be practiced and more fully and definitely understood, the following examples of processes which we have used in the direct production of strong phosphoric acid containing about 50 to 60 percent $P_2O_5$ of the character indicated herein is given by way of illustration and not by way of limitation.

EXAMPLE I

A small-scale test was carried out employing a process generally shown by the flowsheet in FIGURE 1. In this test, high-grade rock (34.6 percent $P_2O_5$, 49.0 percent CaO, 36 percent minus 200 mesh) was acidulated with the amount of fuming sulfuric acid (15 to 20 percent free $SO_3$) required to react with all of the CaO in the rock. The acidulate was held in a Dewar flask for 60 minutes during which time its temperature dropped from about 550° F. to about 416° F. Then the hot acidulate was quenched and washed countercurrently in eight steps with $H_2O$ as a final wash (ratio of $H_2O$ to acidulate of 0.8). The liquor would flow through the bed under the force of gravity in less than 30 seconds; however, use of vacuum filtration was helpful in reducing the amount of wash liquor retained in the filter cake. The product acid contained 49.5 percent P$_2$O$_5$ and 0.6 percent fluorine; 95.5 percent of the P$_2$O$_5$ was recovered from the rock. The results of this small-scale test are given below.

*Table 1*

| | |
|---|---|
| Rock, percent P$_2$O$_5$ | 35 |
| Denning time, min. | 60 |
| Temperature of acidulate when quenched, °F. | 416 |
| Weight ratio: | |
|    Quench liquor to acidulate | 0.78 |
|    Product to acidulate | 0.41 |
|    Wet residue to acidulate | 1.01 |
| Product analysis, percent: | |
|    P$_2$O$_5$ | 49.5 |
|    F | 0.6 |
| P$_2$O$_5$ recovered from rock, percent | 95.5 |

EXAMPLE II

Additional small-scale tests were carried out as in Example I above except that the acidulates were held in the Dewar flask for 20 minutes during which time the acidulate temperature dropped from about 550° F. to about 450° F. The hot acidulate was quenched and washed countercurrently in eight steps. P$_2$O$_5$ concentrations in the products and P$_2$O$_5$ recoveries from the rock were not appreciably changed by the shorter denning time. The results of the tests are given below.

*Table 2*

| | |
|---|---|
| Rock, percent P$_2$O$_5$ | 35 |
| Denning time, min. | 20 |
| Temperature of acidulate when quenched, °F. | 446 |
| Weight ratio: | |
|    Quench liquor to acidulate | 0.91 |
|    Product acid to acidulate | 0.40 |
|    Wet residue to acidulate | 1.01 |
| Product analysis, percent: | |
|    P$_2$O$_5$ | 51.7 |
|    F | 0.5 |
| P$_2$O$_5$ recovered from rock, percent | 96.8 |

EXAMPLE III

Additional small-scale tests were carried out as in Example I above except that silica as diatomaceous earth (3 percent by weight) was added to the phosphate rock prior to acidulation as a means of reducing the fluorine content of the products. The results of these tests are given below.

*Table 3*

| | |
|---|---|
| Rock, percent P$_2$O$_5$ | 35 |
| Denning time, min. | 60 |
| Temperature of acidulate when quenched, °F. | 415 |
| Weight ratio: | |
|    Quench liquor to acidulate | 0.94 |
|    Product to acidulate | 0.38 |
|    Wet residue to acidulate | 1.03 |
| Product analysis, percent: | |
|    P$_2$O$_5$ | 55.0 |
|    F | 0.2 |
| P$_2$O$_5$ recovered, percent | 89.8 |

The fluorine to phosphorus ratio in the product was 0.83:100 as compared to 2.8:100 for product in Example I. The product from Example III was suitable for feed-grade acid. A fluorine to phosphorus ratio of 1:100 is permissible for feed-grade acid. The product concentration was increased to 55 percent P$_2$O$_5$; the P$_2$O$_5$ recovery was about 90 percent.

EXAMPLE IV

Additional small-scale tests were carried out as in Example I above except that about 3 percent silica flour was added prior to acidulation and the hot acidulate was quenched and washed countercurrently in ten steps rather than eight. The results of these tests are given below.

*Table 4*

| | |
|---|---|
| Rock, percent P$_2$O$_5$ | 35 |
| Denning time, min. | 60 |
| Temperature of acidulate when quenched, °F. | 455 |
| Weight ratio: | |
|    Quench liquor to acidulate | 0.73 |
|    Product to acidulate | 0.35 |
|    Wet residue to acidulate | 1.01 |
| Product analysis, percent: | |
|    P$_2$O$_5$ | 57.9 |
|    F | 0.4 |
| P$_2$O$_5$ recovered from rock, percent | 94.8 |

The silica flour increased the product concentration even further to 58 percent P$_2$O$_5$, but the fluorine content was not as low as with diatomaceous earth. The two additional steps in the wash system helped to maintain high P$_2$O$_5$ recovery while producing the very strong acid.

EXAMPLE V

Additional small-scale tests were carried out as in Example IV above except that no supplemental silica was used and the weight ratio of water to acidulate at the last stage was reduced from about 0.8 to about 0.7 as a means of further increasing the product concentration. The results of these tests are given below.

*Table 5*

| | |
|---|---|
| Rock, percent P$_2$O$_5$ | 35 |
| Denning time, min. | 60 |
| Temperature of acidulate when quenched, °F. | 472 |
| Weight ratio: | |
|    Quench liquor to acidulate | 0.74 |
|    Product to acidulate | 0.30 |
|    Wet residue to acidulate | 1.01 |
| Product analysis, percent: | |
|    P$_2$O$_5$ | 60.0 |
|    F | 0.4 |
| P$_2$O$_5$ recovered from rock, percent | 87.8 |

The product concentration was increased to 60 percent by reducing the amount of water introduced to the system but at the expense of lower P$_2$O$_5$ recovery (88 percent) from the rock. The concentration might better be increased by use of supplemental silica as indicated by Example IV.

While we have shown and described particular embodiments of our invention, modifications and variations thereof will occur to those skilled in the art. We wish it to be understood, therefore, that the appended claims are intended to cover such modifications and variations which are within the true scope and spirit of our invention.

What we claim as new and desire to secure by Letters Patent of the United States is:

1. A process for the manufacture of concentrated phosphoric acid having a low fluorine content which comprises the steps of acidulating phosphate rock ground to approximately 20 to 90 percent minus 200 mesh with fuming sulfuric acid containing from about 15 to 20 percent free SO$_3$ (approximately 103 percent to 104.5 percent H$_2$SO$_4$ equivalent), said fuming sulfuric acid being heated to a temperature in the range from about 150° F. to about 200° F. the degree of fineness to which said phosphate rock is ground, in the range set forth, being inversely dependent and proportional to the percent of free SO$_3$ in said fuming sulfuric acid; retaining the resulting acidulate in a vessel equipped to provide a tumbling action for approximately 20 to 60 minutes to retain a substantial portion of the autogenous heat from the reaction between said phosphate rock and said fuming sulfuric acid, to permit fluorine and other gases to evolve and to allow the resulting granules or particles to become dry and firm; withdrawing from said vessel at a temperature of about 400° F. to 450° F. said resulting firm granules from said acidulate; quenching said firm granules in wash liquor from the end step of a countercurrent extraction system, said wash liquor containing approximately 46 to 58 percent $P_2O_5$ and leaching said firm granules countercurrently with water to form phosphoric acid containing approximately 50 to 60 percent $P_2O_5$, said process being characterized by the fact that substantially all of the heat necessary to effect the reaction between said fuming sulfuric acid and said ground phosphate rock in the acidulating vessel to cause said acidulate through the tumbling action therein to result in dry, firm granules during the holding period of approximately 20 to 60 minutes is supplied by the chemical heat of reaction of the reactants, thereby substantially eliminating the necessity for supplying external heat to the system comprising said process, and said process further characterized by the fact that the reaction between said reactants is carried out to a substantial extent during the holding period of approximately 20 to 60 minutes within the acidulating vessel wherein said tumbling action effects the transformation of the acidulate into the physical form of dry, firm granules.

2. A process for the manufacture of concentrated phosphoric acid having a low fluorine content which comprises the steps of acidulating phosphate rock ground to approximately 20 to 90 percent minus 200 mesh with fuming sulfuric acid containing up to about 65 percent free $SO_3$ (approximately 100.1 percent to 108 percent $H_2SO_4$ equivalent), the degree of fineness to which said phosphate rock is ground, in the range set forth, being inversely dependent and proportional to the percent of free $SO_3$ in said fuming sulfuric acid; retaining the resulting acidulate in a vessel equipped to provide a tumbling action for approximately 20 to 60 minutes to retain a substantial portion of the autogenous heat from the reaction between said phosphate rock and said fuming sulfuric acid, to permit fluorine and other gases to evolve, and to allow the resulting granules to become dry and firm; withdrawing from said vessel at a temperature of about 400° F. to 450° F. said resulting firm granules from said acidulate; quenching said firm granules in wash liquor from the end step of a countercurrent extraction system, said wash liquor containing approximately 46 to 58 percent $P_2O_5$; and leaching said firm granules countercurrently with water to form phosphoric acid containing approximately 50 to 60 percent $P_2O_5$, said process being characterized by the fact that substantially all of the heat necessary to effect the reaction between said fuming sulfuric acid and said ground phosphate rock in the acidulating vessel to cause said acidulate through the tumbling action therein to result in dry, firm granules during the holding period of approximately 20 to 60 minutes is supplied by the chemical heat of reaction of the reactants, thereby substantially eliminating the necessity for supplying external heat to the system comprising said process, and said process further characterized by the fact that the reaction between said reactants is carried out to a substantial extent during the holding period of approximately 20 and 60 minutes within the acidulating vessel wherein said tumbling action effects the transformation of the acidulate into the physical form of dry, firm granules.

3. A process for the manufacture of concentrated phosphoric acid having a low fluorine content which comprises the steps of acidulating phosphate rock ground to approximately 20 to 90 percent minus 200 mesh with fuming sulfuric acid containing up to about 65 percent free $SO_3$ (approximately 100.1 percent to 108 percent $H_2SO_4$ equivalent), said sulfuric acid being heated to a temperature in the range from about 150° F. to about 200° F., the degree of fineness to which said phosphate rock is ground, in the range set forth, being inversely dependent and proportional to the percent of free $SO_3$ in said fuming sulfuric acid; retaining the resulting acidulate in a vessel equipped to provide a tumbling action for approximately 20 to 60 minutes to retain a substantial portion of the autogenous heat from the reaction between said phosphate rock and said fuming sulfuric acid, to permit fluorine and other gases to evolve, and to allow the resulting granules to become dry and firm; withdrawing from said vessel at a temperature of about 400° F. to about 450° F. said resulting firm granules from said acidulate; quenching said firm granules in wash liquor from the end step of a countercurrent extraction system, said wash liquor containing approximately 46 to 58 percent $P_2O_5$; and leaching said firm granules countercurrently with water to form phosphoric acid containing approximately 50 to 60 percent $P_2O_5$, said process being characterized by the fact that substantially all of the heat necessary to effect the reaction between said fuming sulfuric acid and said ground phosphate rock in the acidulating vessel to cause said acidulate through the tumbling action therein to result in dry, firm granulates during the holding period of approximately 20 to 60 minutes is supplied by the chemical heat of reaction of the reactants, thereby substantially eliminating the necessity for supplying external heat to the system comprising said process, and said process further characterized by the fact that the reaction between said reactants is carried out to a substantial extent during the holding period of approximately 20 to 60 minutes within the acidulating vessel wherein said tumbling action effects the transformation of the acidulate into the physical form of dry, firm granulates.

References Cited by the Examiner

UNITED STATES PATENTS

| | | | |
|---|---|---|---|
| 1,637,428 | 8/27 | Rupp | 71—40 X |
| 1,870,602 | 8/32 | Case | 71—40 |
| 2,061,567 | 11/36 | Facer | 71—40 |
| 2,504,544 | 4/50 | Legal et al. | 23—165 |
| 2,856,506 | 10/58 | Telkes | 219—39 |
| 2,890,936 | 6/59 | Benefield | 23—165 |
| 3,044,851 | 7/62 | Young | 23—107 |

MAURICE A. BRINDISI, *Primary Examiner.*

UNITED STATES PATENT OFFICE
CERTIFICATE OF CORRECTION

Patent No. 3,161,467

December 15, 1964

Travis P. Hignett et al.

It is hereby certified that error appears in the above numbered patent requiring correction and that the said Letters Patent should read as corrected below.

Column 2, line 12, for "prio" read -- prior --; column 8, line 1, for "and" read -- to --; lines 35 and 45, for "granulates", each occurrence, read -- granules --.

Signed and sealed this 20th day of April 1965.

(SEAL)
Attest:

ERNEST W. SWIDER
Attesting Officer

EDWARD J. BRENNER
Commissioner of Patents